United States Patent
Onwuta (10) Patent No.: US 9,885,869 B2
(45) Date of Patent: Feb. 6, 2018

(54) THINK AND ZOOM

(71) Applicant: Azubuike Victor Onwuta, Austin, TX (US)

(72) Inventor: Azubuike Victor Onwuta, Austin, TX (US)

( * ) Notice: Subject to any disclaimer, the term of this patent is extended or adjusted under 35 U.S.C. 154(b) by 55 days.

(21) Appl. No.: 14/802,980

(22) Filed: Jul. 17, 2015

(65) Prior Publication Data

US 2017/0017080 A1    Jan. 19, 2017

(51) Int. Cl.
| | |
|---|---|
| G09G 5/00 | (2006.01) |
| G02B 27/01 | (2006.01) |
| G06T 3/40 | (2006.01) |
| G06F 3/01 | (2006.01) |

(52) U.S. Cl.
CPC ....... *G02B 27/017* (2013.01); *G02B 27/0172* (2013.01); *G06F 3/013* (2013.01); *G06F 3/015* (2013.01); *G06F 3/017* (2013.01); *G06T 3/40* (2013.01)

(58) Field of Classification Search
None
See application file for complete search history.

(56) References Cited

U.S. PATENT DOCUMENTS

| | | | | |
|---|---|---|---|---|
| 2013/0050432 A1* | 2/2013 | Perez | ............... | H04N 13/0278 348/47 |
| 2013/0342572 A1* | 12/2013 | Poulos | ............... | G02B 27/017 345/633 |
| 2015/0022437 A1* | 1/2015 | Rangiah | ............... | G06F 3/015 345/156 |
| 2015/0317810 A1* | 11/2015 | Grunwald | ............... | A61B 90/00 345/440.1 |
| 2015/0338917 A1* | 11/2015 | Steiner | ............... | H04L 9/3231 345/156 |
| 2016/0035136 A1* | 2/2016 | Sendai | ............... | G02B 27/0172 345/633 |

* cited by examiner

*Primary Examiner* — Peter Hoang
(74) *Attorney, Agent, or Firm* — Craige Thompson; Thompson Patent Law (57) ABSTRACT

Disclosed are various embodiments for implementing a zooming application that pairs an optical head mounted display (OHMD) device with an electroencephalogram (EEG) sensor to facilitate the control and the level of magnification as well as the text-to-speech conversion of any text depicted on an optical head mounted display device. The zooming application may be configured to perform various operations such as, for example, zoom-in, zoom-out, text-to-speech, freeze, and/or other operations on an image as well as text depicted on an optical head mounted display device in response to a triggering signal obtained from the electroencephalogram (EEG) sensor, motion detecting sensor, neural implant, or other sensor.

20 Claims, 5 Drawing Sheets

THINK AND ZOOM

BACKGROUND

Many people suffer from visual impairment conditions, such as, for example, glaucoma, macular degeneration, retinitis pigmentosa, and/or other diseases that may cause an individual's eyesight to degrade and could potentially lead to blindness. People with low vision can experience difficulty performing everyday tasks, such as reading text, recognizing familiar faces or the edges of steps. As a result, independent living for people with low vision is threatened. Therefore, there is a need to assist people in resolving the daily challenges of living with a visual impairment.

BRIEF SUMMARY OF THE INVENTION

The present disclosure pairs an optical head mounted display (OHMD) device, with an electroencephalogram (EEG) sensor to facilitate the control and the level of magnification delivered by the optical head mounted display (OHMD) device. The present disclosure provides the ability to achieve hands-free magnification on demand that is triggered by brain activity as measured through the electroencephalogram (EEG) device worn by the individual that is attempting to gain sight enhancement. Signals received from the electroencephalogram (EEG) sensor initially trigger the zooming application on the optical head mounted display (OHMD) device to begin magnification of the object in the viewfinder. As the object becomes magnified by the optical head mounted display (OHMD) device to the point of visual clarity, feedback signals from the electroencephalogram (EEG) sensor slow down and eventually halt the magnification processing. The present disclosure relates to embodiments that may be light-weight, mobile and dynamic, may be configured to employ direct biometric feedback from the electroencephalogram (EEG) sensor to enable nearly autonomic control of the various embodiments of the present disclosure.

DETAILED DESCRIPTION

The present disclosure relates to implementing a zooming application that may perform various operations such as, for example, zoom-in, zoom-out, text-to-speech, freeze, and/or other operations on an image depicted on an optical head mounted display (OHMD) device, a camera preview of a user's environment, and combinations thereof. Various embodiments of the present disclosure facilitate detection of brain waves of a user using a sensor such as, for example an electroencephalogram (EEG) sensor, a neural implant, and/or other sensors used for the detection of brain waves. In one embodiment, the brain waves may be detected externally using an electroencephalogram (EEG) sensor. In another embodiment, the brain waves may be detected internally using a neural implant.

In one embodiment, the sensor may be configured to detect at least one electrical signal associated with a brain activity of a user. For example, the brain waves detected by the sensor may indicate that a user is focusing to see an image depicted in the optical head mounted display (OHMD) device. Upon receipt of at least electrical signal indicating that the user is focusing, the sensor may send a triggering signal to the zooming application. Upon receipt of the triggering signal, the zooming application may be configured to direct the optical head mounted display (OHMD) device to magnify the image depicted in the view of the display device. For example, the zooming application may direct the optical head mounted display (OHMD) device to perform zoom-in and/or zoom-out operations. Brain waves may be emitted in different frequencies so the signal for zoom-in may be different from the signal for zoom-out. The zoom-in operation may be configured to focus a lens in order to obtain a larger image, or a closer view. The zoom-out operation may be configured to focus a lens in order to obtain a smaller image, or a more distant view.

In one embodiment, the optical head mounted display (OHMD) device includes a camera configured to capture one or images to display to the user. Communication between the sensor, the zooming application, and the optical head mounted display (OHMD) device may be done wirelessly. In the following discussion, a general description of the system and its components is provided, followed by a discussion of the operation of the same.

Figure 1:
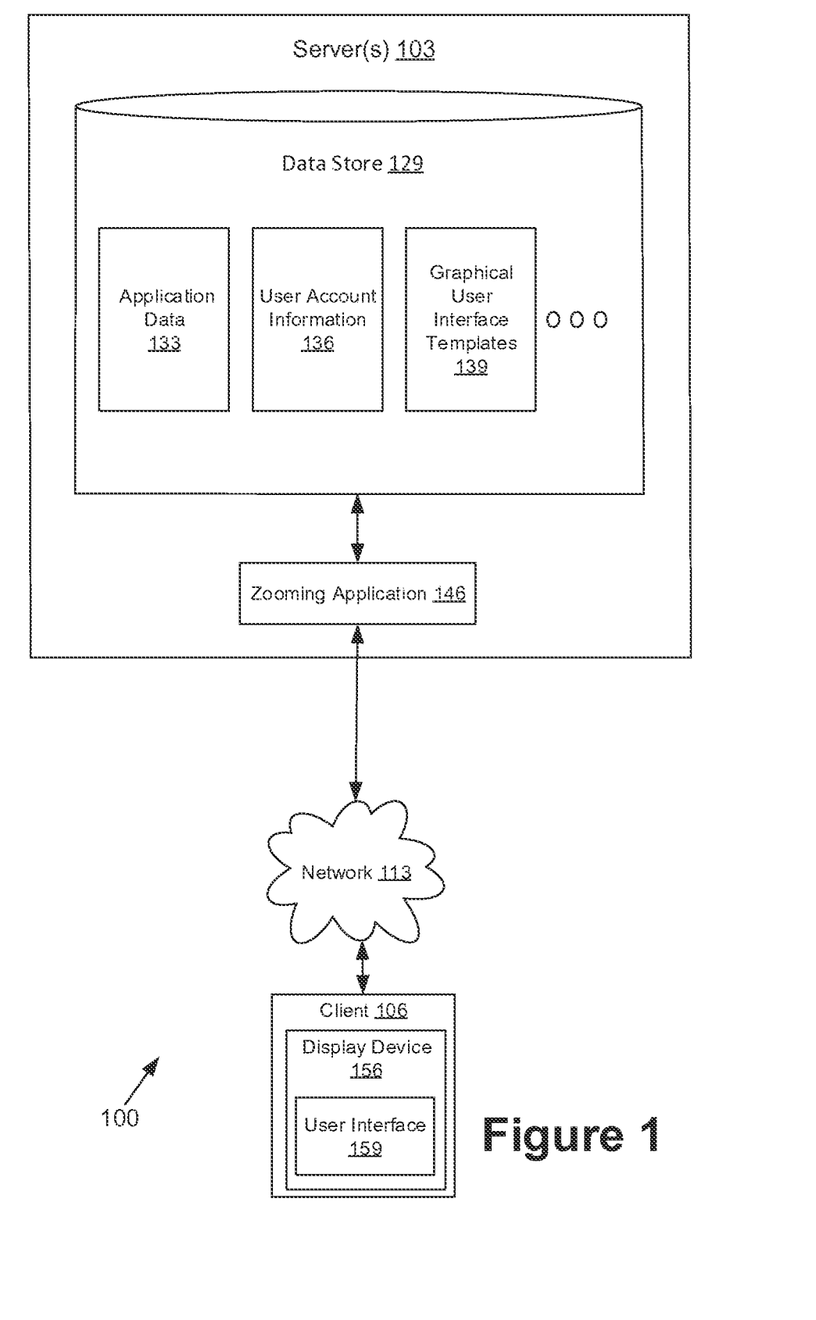
FIG. 1 shows a networked environment according to various embodiments of the present disclosure.

With reference to FIG. 1, shown is a networked environment 100 that includes, for example, at least one server 103, and a client 106. The server 103 may represent multiple servers that may be arranged to work in coordination with each other. Alternatively, such servers 103 may be arranged in some other manner, as can be appreciated. The client 106 is configured to access information on the server 103 as will be described. Both the server 103 and the client 106 are coupled to a network 113. The client 106 may comprise for example, a processor-based system such as a computer system. Such a computer system may be embodied in the form of a desktop computer, a laptop computer, a personal digital assistant, a cellular telephone, web pads, tablet computer systems, smartphones, and other devices with like capability. The network 113 may comprise, for example, any type of network environment such as the Internet, intranets, local area networks, wide area networks, wireless networks, or other networks, or a combination of two or more of such networks as can be appreciated. Although only a single client 106 is shown, the client 106 represents many clients 106 that can exist on the network 113.

According to various embodiments, the server 103 includes various applications that are executed, for example, to effect and control the level of magnification of images shown to a user via an optical head mounted display (OHMD) device such that the level of magnification may be controlled using signals from a sensor such as, for example, an electroencephalograph (EEG) based biofeedback system that measures brain waves to produce a signal.

The data in the data store 129 is used during the normal operation of the zooming application 146. For example, stored within the data store 129 are application data 133, user account information 136, graphical user interface templates 139, and other information as can be appreciated.

The application data 133 may include various information such as images captured by the optical head mounted display device, initial state data, predetermined threshold sound measurements, and/or other application data 133 as can be appreciated. The user account information 136 may include personal information about various users such as, for example, name, address, passwords, and other information. The graphical user interface templates 139 may include various user interface layouts and other components that are used by the zooming application 146 to generate user interfaces that are served up to the client 106 as will be described. In addition, there may be other information included in the data store 129 in order to effect and control magnification of images as can be appreciated.

According to various embodiments, the zooming application 146 is executed by the server 103. However, it is possible that the zooming application 146 may employ some other technology such as, for example, a client side application, that allows the zooming application 146 to interface with the server 103 as can be appreciated.

The client 106 may include a display device 156 that is employed to render user interfaces 159 that may comprise a portion of a network page. Such network pages may be generated dynamically using various software platforms such as AJAX, PERL, JAVA, or other software platforms as can be appreciated.

The user of a client 106 may manipulate the respective user interfaces 159 to effect and control the level of magnification of images displayed to the user. In addition, a user may manipulate the user interface(s) 159 rendered on the display device 156 of the client 106 to facilitate other functions as will be described. The display device 156 may be any type of display device including a liquid crystal display (LCD), a cathode-ray tube (CRT), a flat plasma panel display, or other display device.

According to various embodiments, the optical head mounted display device and the EEG sensor are two connected devices that may be coupled on a System on Chip (SOC), connected wirelessly, or connected wired.

Next, a general description of the operation of the various components of the networked environment 100 is provided. To begin, a user wearing a wearable display such as, for example, an optical head mounted display (OHMD) device, that has the capability of reflecting projected images as well as allowing the user to see through the optical head mounted display (OHMD) device. A sensor such as, for example, a electroencephalogram (EEG) sensor, a neural implant, or other sensors configured to detect at least one electrical signal associated with the brain waves of a user is paired with the optical head mounted display (OHMD) device. The zooming application 146 which may be initiated by a client side application using a client 106 and executable in the server 103 is configured to obtain a triggering signal over a network 113 from the sensor and directs the optical head mounted display (OHMD) device to perform a zooming function on the image depicted on the display device in response to the triggering signal.

For example, when the user wearing the optical head mounted display (OHMD) device and the sensor looks at an object, the sensor may detect the user's brain waves indicating that the user is focusing to in order to view the object it in a larger form. The sensor is configured to detect at least one electrical signal associated with the brain activity of the user that corresponds to a focusing signal. Upon detection of the focusing signal, a triggering signal is generated and sent to the zooming application 146 over a network 113. Upon receipt of the triggering signal, the zooming application 146 directs the optical head mounted display (OHMD) device to perform a zooming operation on the image of the object. In one embodiment, the zooming operation corresponds to a zoom-in operation which results in the image of the object being magnified. In another embodiment, the zooming operation corresponds to a zoom-out operation which results in the image of the object being viewed in smaller form.

In yet another embodiment, the sensor is configured to detect at least one electrical signal corresponding to an eye change such as, for example, an eye blink, eye dilation, eye focus, eye squinting, and other eye changes or eye movements, and generates a signal in response to the detection of the corresponding eye change and/or eye movement which directs the optical head mounted display (OHMD) device to perform one or more functions. As a non-limiting example, upon detection of an eye blink, the sensor generates a signal that is obtained by the zooming application 146 which directs the optical head mounted display (OHMD) device to freeze the image.

In still another embodiment, the optical head mounted display (OHMD) device comprises an accelerometer and is configured to detect to a head tilt of a user. Upon detection of a head tilt of the user, the optical head mounted display (OHMD) device is reset to an initial state.

Figure 2:
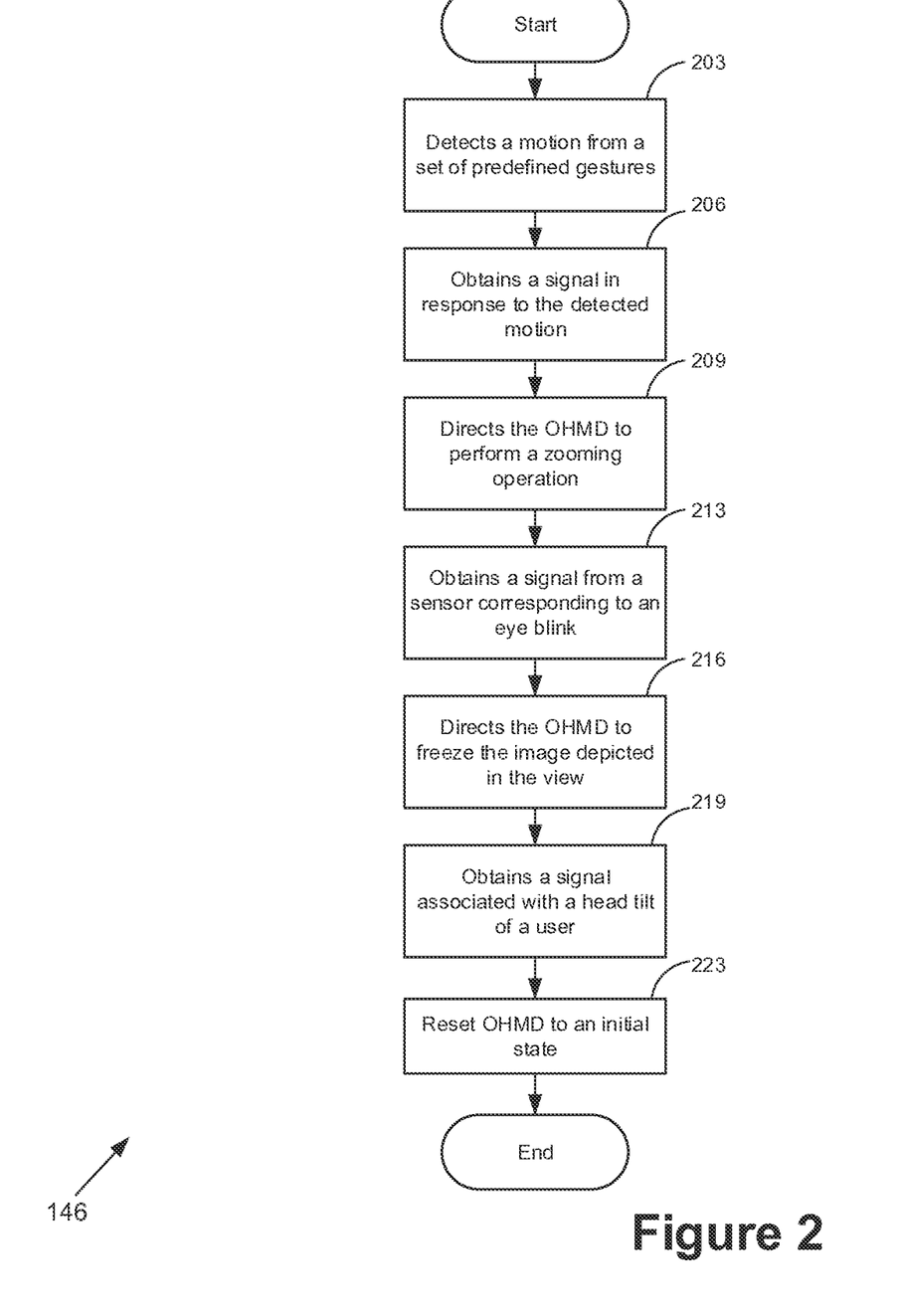
FIG. 2 shows a flowchart illustrating one example of the functionality of the zooming application to facilitate the control and the level of magnification delivered by the optical head mounted display (OHMD) device in response to a detected motion obtained from a server in the networked environment of FIG. 1 according to various embodiments of the present disclosure.

Turning now to FIG. 2, shown is a flowchart that provides one example of the operation of a portion of the zooming application 146 to facilitate the control and the level of magnification delivered by the optical head mounted display device in response to a detected motion according to various embodiments. It is understood that the flowchart of FIG. 2 provides merely an example of the many different types of functional components that may be employed to implement the operation of the zooming application 146 as described herein. As an alternative, the flowchart of FIG. 2 may be viewed as depicting an example of steps of a method implemented in the server 103 (FIG. 1) according to various embodiments. The flowchart sets forth an example of the functionality of the zooming application 146 according to various embodiments. While magnification of an image of an object is discussed, it is understood that this is merely an example of the many different types of functions that may be implemented with the uses of the zooming application 146. It is understood that the flow may differ depending on the specific circumstances. Also, it is understood that other flows and user actions may be employed other than those described herein.

Beginning in box 203, an optical head mounted display (OHMD) device comprising a camera and a motion sensor detects a motion or gesture such as a pinch, a swipe, and/or other gestures performed by a user in order to activate certain subroutines attached to predefined gestures. Then, the zooming application 146 moves to box 206 and obtains a signal in response to the detected motion. The zooming application 146 then moves to box 209 and directs the optical head mounted display device to perform a zooming operation in response to the signal. For example, a user employing an optical head mounted display device may move their fingers toward each other, as if pinching them together to active a zoom-in function. As another example, a user may move their fingers away from each other, as if stretching them apart to activate a zoom-out function. In this embodiment, the optical head mounted display (OHMD) device comprising a camera and a motion sensor, may be configured to perform zooming functions to make an item on the screen larger or smaller in response to a detection of at least one of a set of predefined gestures. As a non-limiting example, with a picture, zooming in shows a smaller area in more detail; zooming out shows a larger area. The zooming application 146 may then move to box 213 and obtain a signal from the sensor such as, for example, electroencephalogram (EEG) sensor, a neural implant, or other sensors configured to detect at least one electrical signal associated with the brain waves corresponding to an eye blink. Upon receipt of the signal, the zooming application 146 moves to box 216 and directs the optical head mounted display (OHMD) device to freeze the image depicted in the view of the optical head mounted display (OHMD) device. The zooming application 146 then moves to box 219 and detects a head tilt of a user. Upon detection of a head tilt of the user, the zooming application 146 moves to box 223 and is reset to an initial state. Thereafter, the zooming application 146 ends.

Figure 3:
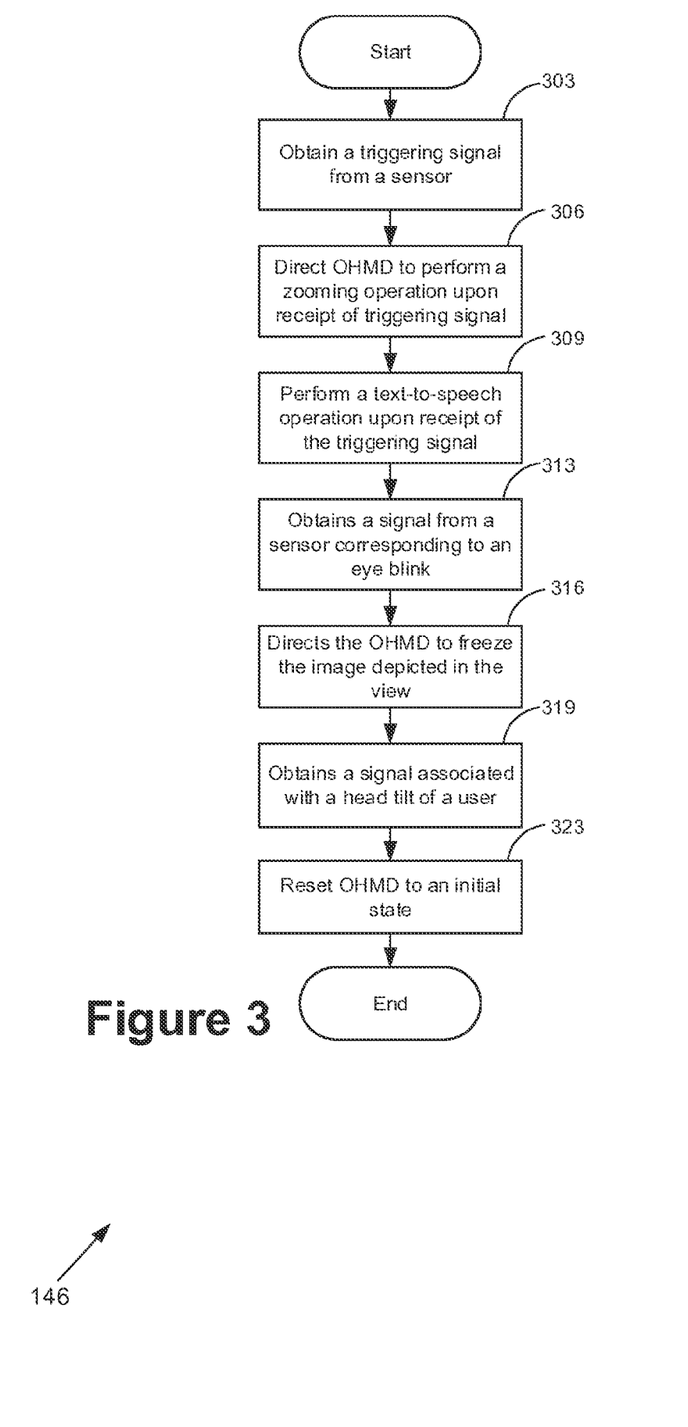
FIG. 3 shows a flowchart illustrating one example of the functionality of the zooming application to facilitate the control and the level of magnification delivered by the optical head mounted display (OHMD) device in response to a triggering signal obtained from sensor according to various embodiments of the present disclosure.

Referring now to FIG. 3, shown is a flowchart that provides one example of the operation of a portion of the zooming application 146 to facilitate the control and the level of magnification delivered by the optical head mounted display (OHMD) device in response to a triggering signal obtained from sensor according to various embodiments. It is understood that the flowchart of FIG. 3 provides merely an example of the many different types of functional components that may be employed to implement the operation of the zooming application 146 as described herein. As an alternative, the flowchart of FIG. 3 may be viewed as depicting an example of steps of a method implemented in the server 103 (FIG. 1) according to various embodiments. The flowchart sets forth an example of the functionality of the zooming application 146 according to various embodiments. While magnification of an image of an object is discussed, it is understood that this is merely an example of the many different types of functions that may be implemented with the uses of the zooming application 146. It is understood that the flow may differ depending on the specific circumstances. Also, it is understood that other flows and user actions may be employed other than those described herein.

Beginning with box 303, the zooming application 146 obtains a triggering signal from a sensor such as, for example, an electroencephalogram (EEG) sensor, a neural implant, and/or other sensors used for the detection of brain waves. In one embodiment, the sensor detects at least one electrical signal corresponding to a focusing signal of a user. As a non-limiting example when a user wearing an optical head mounted display (OHMD) device paired with a sensor views an image of an object, the user focuses on or "thinks" about seeing the image of the object in a larger form. The brain activity corresponding to the user's focusing activity is detected by the sensor and the triggering signal is generated. The zooming application 146 then moves to box 306 and directs the optical head mounted display (OHMD) device to perform a zooming operation in upon receipt of the triggering signal. The zooming operation 146 may then move to box 309 and perform a text-to-speech operation in response to the triggering signal. For example, the text-to-speech operation may read the text depicted in the view of an optical head mounted display (OHMD) device employed by a user. The zooming application 146 may then move to box 313 and obtain a signal from the sensor such as, for example, electroencephalogram (EEG) sensor, a neural implant, or other sensors configured to detect at least one electrical signal associated with the brain waves corresponding to an eye blink. Upon receipt of the signal, the zooming application 146 moves to box 316 and directs the optical head mounted display to freeze the image depicted in the view of the optical head mounted display (OHMD) device. The zooming application 146 then moves to box 319 and detects a head tilt of a user. Upon detection of a head tilt of the user, the zooming application 146 moves to box 323 and is reset to an initial state. Thereafter, the zooming application 146 ends.

Figure 4:
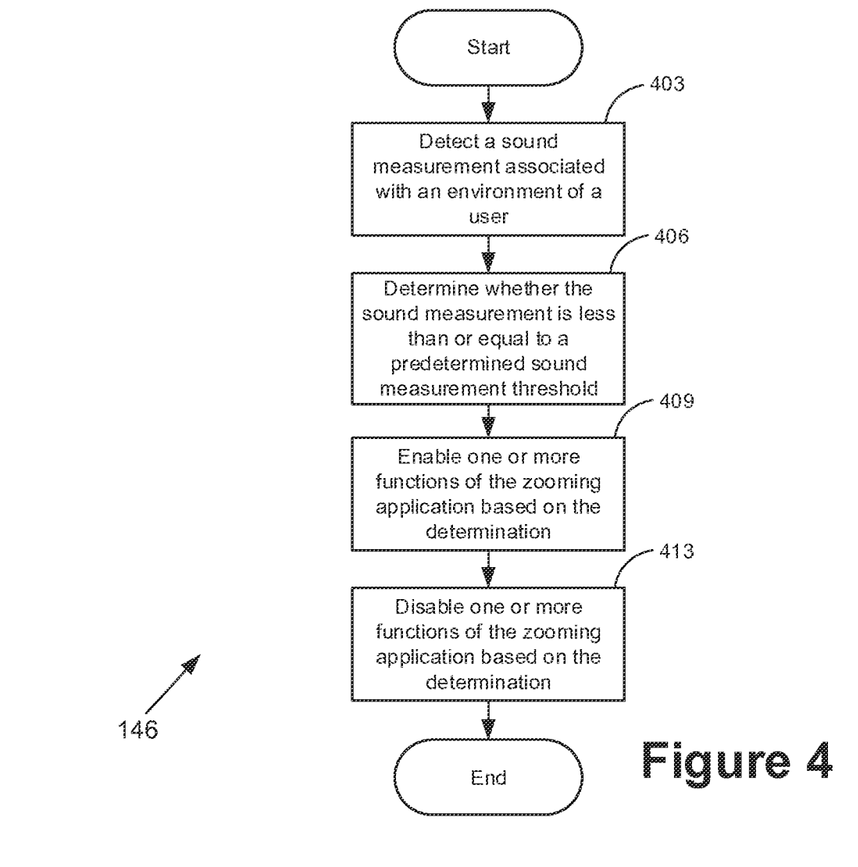
FIG. 4 shows a flowchart illustrating one example of the functionality of the zooming application to facilitate the activation and/or deactivation of one or more functions of the zooming application based at least in part on a determination of whether a sound measurement is less than or equal to a predetermined sound measurement threshold according to various embodiments of the present disclosure.

Turning now to FIG. 4, shown is a flowchart that provides one example of the operation of a portion of the zooming application 146 to facilitate the activation and/or deactivation of one or more functions of the zooming application 146 based at least in part on a determination that a sound measurement is less than or equal to a predetermined sound measurement threshold according to various embodiments. For example, the zooming application 146 may be configured to disable or enable the use of either brain waves or pre-defined motion as the control mechanism for visual magnification of an image depicted in a user's view of a display device or text-to-speech conversion of text depicted in a user's view of a display device, based on the noise level of the surrounding environment, as detected by a sound sensor. Additionally, the zooming application 146 may be configured to perform voice recognition operations. For example, the zooming application 146 may detect a sound associated with the voice of a user and launch one or more functions in response to the detection of the user's voice. It is understood that the flowchart of FIG. 4 provides merely an example of the many different types of functional components that may be employed to implement the operation of the zooming application 146 as described herein. As an alternative, the flowchart of FIG. 4 may be viewed as depicting an example of steps of a method implemented in the server 103 (FIG. 1) according to various embodiments. The flowchart sets forth an example of the functionality of the zooming application 146 according to various embodiments. While activation and/or deactivation of various functions of the zooming application 146 are discussed, it is understood that this is merely an example of the many different types of functions that may be implemented with the uses of the zooming application 146. It is understood that the flow may differ depending on the specific circumstances. Also, it is understood that other flows and user actions may be employed other than those described herein.

Beginning with box 403, the zooming application 146 detects a sound measurement associated with the environment of a user. As an example, the zooming application 146 may be configured to use a microphone to detect the sound measurement. The zooming application 146 then moves to box 406 and determines whether the sound measurement is less than or equal to a predetermined sound measurement threshold. For example, the zooming application 146 may determine that the sound measurement associated with the environment of the user is less than or equal to fifty decibels. The zooming application 146 then moves to box 409 enables one or more functions of the zooming application 146 based at least in part on the determination. For example, one or more of the functions of the zooming application 146 which are enabled is selected from the group consisting of: think-and-zoom, think-and-hear, move-and-zoom, and move-and-hear.

As a non-limiting example, the think-and-zoom function of the zooming application 146 may be configured to use brain waves, detected by a sensor located either inside or outside the brain of user, such that the detected brain waves control the visual magnification, of the user's view. As another non-limiting example, the think-and-hear function of the zooming application 146 may be configured to use brain waves, detected by a sensor positioned inside or outside of the brain, such that the detected brain waves control the execution of a text-to-speech operation on text depicted in a user's view of a display device. As yet another non-limiting example, the move-and-zoom function of the zooming application 146 may be configured to detect a predefined motion using a sensor, to control the visual magnification, of an image depicted in user's view of a display device. As another non-limiting example, the move-and-hear function of the zooming application 146 may be configured to detect a predefined motion using a sensor positioned externally or internally to the brain of a user to control the visual magnification of an image depicted in a user's view of a display device.

The zooming application 146 then moves to box 413 and disables one or more functions of the zooming application 146 based at least in part on the determination. For example, one or more of the functions of the zooming application 146 which are disabled is selected from the group consisting of: think-and-zoom, think-and-hear, move-and-zoom, and move-and-hear. Thereafter, the zooming application 146 ends.

Figure 5:
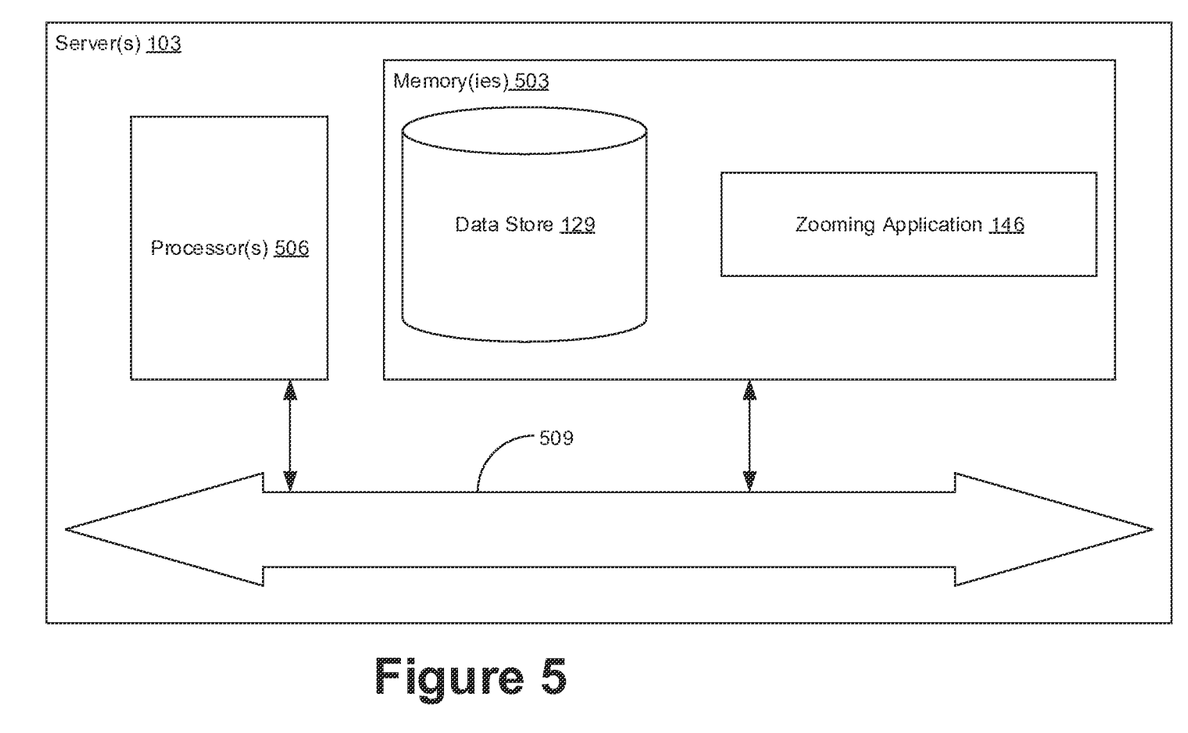
FIG. 5 is a drawing of one example of a server in the networked environment of FIG. 1 according to various embodiments of the present disclosure.

With reference to FIG. 5 shown is a schematic block diagram of the server(s) 103 according to an embodiment of the present disclosure. The server(s) 103 includes at least one processor circuit, for example, having a processor 506 and a memory 503, both of which are coupled to a local interface 509. To this end, the server(s) 103 may comprise, for example, at least one server computer or like device. The local interface 509 may comprise, for example, a data bus with an accompanying address control bus or other bus structure as can be appreciated. Stored in the memory 503 are both data and several components that are executable by the processor 506. In particular, stored in the memory 503 and executable by the processor 506 are the zooming application 146 and potentially other applications. Also stored in the memory 503 may be a data store 129 and other data. In addition, an operating system may be stored in the memory 503 and executable by the processor 506.

It is understood that there may be other applications that are stored in the memory 503 and are executable by the processors 506 as can be appreciated. Where any component discussed herein is implemented in the form of software, anyone of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 503 and are executable by the processor 506. In this respect, the term "executable" means a program file that is in a form that can ultimately be run by the processor 506. Examples of executable programs may be, for example, a compiled program that can be translated into machine code in a format that can be loaded into a random access portion of the memory 503 and run by the processor 506, source code that may be expressed in proper format such as object code that is capable of being loaded into a random access portion of the memory 503 and executed by the processor 506, or source code that may be interpreted by another executable program to generate instructions in a random access portion of the memory 503 to be executed by the processor 506, etc. An executable program may be stored in any portion or component of the memory 503 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 503 is defined herein as including both volatile and nonvolatile memory and data storage components. Volatile components are those that do not retain data values upon loss of power. Nonvolatile components are those that retain data upon a loss of power. Thus, the memory 503 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 506 may represent multiple processors 506 and the memory 503 may represent multiple memories 503 that operate in parallel processing circuits, respectively. In such a case, the local interface 509 may be an appropriate network 113 (FIG. 1) that facilitates communication between any two of the multiple processors 506, between any processor 506 and any of the memories 503, or between any two of the memories 503, etc. The local interface 509 may comprise additional systems designed to coordinate this communication, including, for example, performing load balancing. The processor 506 may be of electrical or of some other available construction.

Although the zooming application 146, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or steady state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 2, FIG. 3 and FIG. 4 show the functionality and operation of an implementation of portions of the zooming application 146. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 506 in a computer system or other system. The machine code may be converted from the source code, etc. If embodied in hardware, each block may represent a circuit or a number of interconnected circuits to implement the specified logical function(s).

Although the flowcharts of FIG. 2, FIG. 3, and FIG. 4 show a specific order of execution, it is understood that the order of execution may differ from that which is depicted. For example, the order of execution of two or more blocks may be scrambled relative to the order shown. Also, two or more blocks shown in succession in FIG. 2, FIG. 3, and FIG. 4 may be executed concurrently or with partial concurrence. Further, in some embodiments, one or more of the blocks shown in FIG. 2, FIG. 3, and FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the zooming application 146, that comprises software or code can be embodied in any non-transitory computer-readable medium for use by or in connection with an instruction execution system such as, for example, a processor 506 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method, comprising the steps of:
   enabling, in a computing device, a plurality of functions of a zooming application;
   detecting, in the computing device, an audio noise level of a user's surrounding environment via a sound sensor;
   determining, in the computing device, whether the audio noise level is less than or equal to a predetermined threshold decibel level;
   if the audio noise level is less than or equal to the predetermined threshold decibel level, enabling, in the computing device, at least one function of a zooming application, and disabling, in the computing device, at least one other function of the zooming application; and,
   if the audio noise level is not less than or equal to a predetermined threshold decibel level, disabling, in the computing device, the at least one function of a zooming application, and enabling, in the computing device, the at least one other function of the zooming application.

2. The method of claim 1, wherein the predetermined threshold decibel level is fifty decibels.

3. The method of claim 1, wherein the at least one function of the zooming application comprises a think-and-zoom function.

4. The method of claim 3, wherein the at least one other function of the zooming application comprises a move-and-zoom function.

5. The method of claim 1, wherein the at least one function of the zooming application comprises a think-and-hear function.

6. The method of claim 5, wherein the at least one other function of the zooming application comprises a move-and-zoom function.

7. The method of claim 6, wherein the move-and-zoom function comprises detecting a user moving their fingers toward each other to activate a zoom-in function, and the user moving their fingers away from each other to activate a zoom-out function.

8. The method of claim 1, wherein the at least one function of the zooming application comprises detecting a voice of a user and performing a zoom function in response to the detection of the user's voice.

9. The method of claim 8, wherein the at least one other function of the zooming application comprises a move-and-zoom function.

10. A computer program product (CPP) tangibly embodied in a non-transitory computer readable medium and containing instructions that, when executed, cause at least one processor to perform operations comprising:
    enabling, in a computing device, a plurality of functions of a zooming application;
    detecting, in the computing device, an audio noise level of a user's surrounding environment via a sound sensor;
    determining, in the computing device, whether the audio noise level is less than or equal to a predetermined threshold decibel level;
    if the audio noise level is less than or equal to the predetermined threshold decibel level, enabling, in the computing device, at least one function of a zooming application, and disabling, in the computing device, at least one other function of the zooming application; and,
    if the audio noise level is not less than or equal to a predetermined threshold decibel level, disabling, in the computing device, the at least one function of a zooming application, and enabling, in the computing device, the at least one other function of the zooming application.

11. The method of claim 10, wherein the at least one function of the zooming application comprises a think-and-zoom function.

12. The method of claim 11, wherein the at least one other function of the zooming application comprises a move-and-zoom function.

13. The method of claim 10, wherein the at least one function of the zooming application comprises a think-and-hear function.

14. The method of claim 13, wherein the at least one other function of the zooming application comprises a move-and-zoom function.

15. The method of claim 10, wherein the at least one function of the zooming application comprises detecting a voice of a user and performing a zoom function in response to the detection of the user's voice.

16. The method of claim 15, wherein the at least one other function of the zooming application comprises a move-and-zoom function.

17. A computer system comprising:
one or more processors which process program instructions;
a memory device connected to said one or more processors; and,
program instructions residing in said memory device for:
enabling, in a computing device, a plurality of functions of a zooming application;
detecting, in the computing device, an audio noise level of a user's surrounding environment via a sound sensor;
determining, in the computing device, whether the audio noise level is less than or equal to a predetermined threshold decibel level;
if the audio noise level is less than or equal to the predetermined threshold decibel level, enabling, in the computing device, at least one function of a zooming application, and disabling, in the computing device, at least one other function of the zooming application; and,
if the audio noise level is not less than or equal to a predetermined threshold decibel level, disabling, in the computing device, the at least one function of a zooming application, and enabling, in the computing device, the at least one other function of the zooming application.

18. The method of claim 17, wherein the at least one function of the zooming application comprises a think-and-zoom function.

19. The method of claim 18, wherein the at least one other function of the zooming application comprises a move-and-zoom function.

20. The method of claim 17, wherein the at least one function of the zooming application comprises a think-and-hear function.

* * * * *